(12) United States Patent  
Mellyn

(10) Patent No.: US 8,439,620 B2
(45) Date of Patent: May 14, 2013

(54) SPEED NUT

(76) Inventor: Brian Mellyn, Los Angeles, CA (US)

( * ) Notice: Subject to any disclaimer, the term of this patent is extended or adjusted under 35 U.S.C. 154(b) by 362 days.

(21) Appl. No.: 12/821,930

(22) Filed: Jun. 23, 2010

(65) Prior Publication Data

US 2011/0318135 A1 Dec. 29, 2011

(51) Int. Cl.
F16B 37/08 (2006.01)

(52) U.S. Cl.
USPC .......................................... 411/433; 411/188

(58) Field of Classification Search ........... 411/432–434
See application file for complete search history.

(56) References Cited

U.S. PATENT DOCUMENTS

| 675,664 | A |   | 6/1901 | Moore |   |
|---|---|---|---|---|---|
| 1,069,451 | A | * | 8/1913 | Marston | 411/437 |
| 2,055,166 | A |   | 9/1936 | Berry |   |
| 2,408,153 | A |   | 9/1946 | Steans et al. |   |
| 2,521,567 | A |   | 9/1950 | Corrigan et al. |   |
| 2,566,593 | A |   | 9/1951 | Bloomfield |   |
| 2,744,436 | A |   | 5/1956 | Ross |   |
| 3,172,603 | A | * | 3/1965 | Bell et al. | 238/79 |
| 3,180,386 | A | * | 4/1965 | Bynum | 411/178 |
| 3,345,899 | A |   | 10/1967 | Fiddler |   |
| 3,367,228 | A |   | 2/1968 | King, Jr. |   |
| 3,926,090 | A | * | 12/1975 | Bunker | 411/434 |
| 4,598,572 | A | * | 7/1986 | Mondello et al. | 29/243.522 |
| 5,017,079 | A |   | 5/1991 | Reynolds |   |
| 5,451,124 | A |   | 9/1995 | Meigs |   |
| 5,660,513 | A |   | 8/1997 | Shibanushi |   |
| 5,700,121 | A |   | 12/1997 | Minola |   |
| 5,906,464 | A |   | 5/1999 | Wedenig |   |
| 6,361,260 | B1 | * | 3/2002 | Schirrmacher | 411/433 |
| 6,974,291 | B2 | * | 12/2005 | Li | 411/437 |
| 2008/0286066 | A1 |   | 11/2008 | Paquet |   |
| 2009/0136321 | A1 | * | 5/2009 | Kosiankowski et al. | 411/432 |
| 2009/0324364 | A1 |   | 12/2009 | Smith |   |

FOREIGN PATENT DOCUMENTS

DE 8525508 U1 10/1985
WO WO 2009/068959 A1 6/2009

OTHER PUBLICATIONS

International Search Report for International Application No. PCT/US2011/041266, International Search Report dated Oct. 19, 2011 and mailed Nov. 1, 2011 (2pgs.).
Written en Opinion of the International Searching Authority for International Application No, PCT/US2011/041266, Written Opinion dated Oct. 19, 2011 and mailed Nov. 1, 2011 (5 pgs.).

* cited by examiner

Primary Examiner — Gary Estremsky
(74) Attorney, Agent, or Firm — Christie, Parker & Hale, LLP

(57) ABSTRACT

A speed nut for engaging a member includes a housing including a first wall having a first opening therethrough for receiving the member and a second wall facing the first inner wall, the first and second walls defining a cavity therebetween; and a plurality of engagement elements arranged in the cavity about a longitudinal axis of the housing to form an opening therebetween, at least one of the engagement elements being freely movable in the cavity between a first position wherein an inner surface of the at least one engagement element is spaced from the longitudinal axis by a first distance for engaging the member and a second position wherein the inner surface of the at least one engagement element is spaced from the longitudinal axis by a second distance greater than the first distance for receiving the member through the opening.

19 Claims, 15 Drawing Sheets

SPEED NUT

FIELD OF THE INVENTION

Aspects of embodiments of the present invention relate to a fastening device, and more particularly to a speed nut that may be quickly and easily engaged with a threaded member.

BACKGROUND

A conventional nut has an internal thread for engaging an external thread of a threaded member, such as a bolt or stud. Further, a conventional nut is installed on an externally threaded member by aligning and engaging the thread of the nut with the thread of the threaded member at an end of the threaded member and then rotating the nut about its longitudinal axis relative to a longitudinal axis of the threaded member such that the nut moves in the longitudinal direction until the nut abuts a member to be fastened, at which point a desired torque may be applied to the nut for fastening.

However, a conventional nut typically cannot be engaged rapidly on a threaded member, especially when a distance between the end of the threaded member inserted through the nut and the member to be fastened is great. This is because a conventional nut must be rotated relative to the threaded member along the thread of the threaded member, which generally runs nearly perpendicular to the longitudinal axis of the threaded member, from the end of the threaded member until the nut abuts the member to be fastened. Furthermore, a conventional nut must be aligned with its longitudinal axis being substantially collinear with the longitudinal axis of the threaded member for engaging the thread at the end of the threaded member, which may be cumbersome. Additionally, because a conventional nut must be rotated along and engaged with a thread of a threaded member from the end of the thread, a defect in the thread of the threaded member, or in the thread of the conventional nut itself, will render proper engagement of the nut on the threaded member difficult, if not impossible. Therefore, a need exists for a nut that may be quickly and easily engaged with a threaded fastener.

SUMMARY

Aspects of embodiments of the present invention provide a speed nut which may be rapidly moved along an externally threaded member by the application of a minimal amount of force. According to another aspect of embodiments of the present invention, a speed nut may be quickly and easily engaged on a threaded member having a defect, such as a damaged thread or a burr. According to yet another aspect of embodiments of the present invention, a speed nut includes a plurality of engagement elements floating in a housing cavity, e.g., such that the engagement elements are self-adjustable when a temperature variation occurs. According to still another aspect of embodiments of the present invention, a speed nut is engageable with a threaded member even when a longitudinal axis of the speed nut is not collinear or parallel with a longitudinal axis of the threaded member.

According to one exemplary embodiment of the present invention, a speed nut for engaging a member includes: a housing including a first wall including a first inner surface and having a first opening therethrough for receiving the member, a second wall including a second inner surface facing the first inner surface, and an outer wall extending between the first and second walls, the first and second walls defining a cavity therebetween; and a plurality of engagement elements arranged in the cavity about a longitudinal axis of the housing to form an opening therebetween, each of the engagement elements including an inner surface distal from the outer wall, and at least one of the engagement elements is freely movable in the cavity between a first position wherein a portion of the inner surface of the at least one engagement element is spaced from the longitudinal axis by a first radial distance for engaging the member and a second position wherein the portion of the inner surface of the at least one engagement element is spaced from the longitudinal axis by a second radial distance greater than the first radial distance for receiving the member through the opening.

In one embodiment, the at least one engagement element is tiltable between the first position wherein the portion of the inner surface of the at least one engagement element is spaced from the second inner surface by a first distance and the second position wherein the portion of the inner surface of the at least one engagement element is spaced from the second inner surface by a second distance less than the first distance.

In one embodiment, each of the engagement elements is freely movable in the cavity between the first position and the second position. In one embodiment, at least one of the engagement elements further includes a tapered portion extending from the inner surface and facing the first inner surface.

In one embodiment, the housing further includes a plurality of partitions protruding from the outer wall into the cavity, a respective one of the plurality of partitions being between each respective pair of adjacent engagement elements of the plurality of engagement elements.

The second wall may have a second opening therethrough for receiving the member, and the second opening may substantially correspond to the first opening. In one embodiment, the second inner surface is inclined relative to the first inner surface. The inner surface of each of the engagement elements may include an arcuate edge.

According to another exemplary embodiment of the present invention, a speed nut for engaging a member includes: a housing including a first wall having a first opening therethrough for receiving the member, a second wall opposite the first wall, and an outer wall extending between the first and second walls, the first and second walls defining a cavity therebetween; and a plurality of engagement elements arranged in the cavity about a longitudinal axis of the housing to form an opening therebetween, each of the engagement elements including an inner surface distal from the outer wall, the plurality of engagement elements including first engagement elements and second engagement elements spaced from the first engagement elements in a direction coinciding with the longitudinal axis, and at least one of the first engagement elements and at least one of the second engagement elements are freely movable in the cavity between respective first positions wherein a portion of the inner surface of the respective engagement element is spaced from the longitudinal axis by a respective first radial distance for engaging the member and respective second positions wherein the portion of the inner surface of the respective engagement element is spaced from the longitudinal axis by a respective second radial distance greater than the respective first radial distance for receiving the member through the opening.

In one embodiment, the at least one first engagement element and the at least one second engagement element are tiltable between the respective first positions wherein the portion of the inner surface of the respective engagement element is spaced from the second wall by a respective first distance and the respective second positions wherein the portion of the inner surface of the at least one engagement element is spaced from the second wall by a second distance less than the first distance.

At least one of the first engagement elements may contact at least one of the second engagement elements. The first wall may include a first inner surface, and the second wall may include a second inner surface facing and inclined relative to the first inner surface. At least one of the engagement elements may further include a tapered portion extending from the inner surface and facing the first wall.

According to another exemplary embodiment of the present invention, a speed fastener assembly includes: a threaded member including a thread, and a speed nut including a housing including a first wall having a first opening therethrough, a second wall opposite the first wall, and an outer wall extending between the first and second walls, the first and second walls defining a cavity therebetween; and a plurality of engagement elements arranged in the cavity about a longitudinal axis of the housing, each of the engagement elements including an inner surface distal from the outer wall, and at least one of the engagement elements is freely movable in the cavity between a first position wherein the inner surface of the at least one engagement element is engageable with the thread of the threaded member and a second position wherein the threaded member is insertable through the first opening and between the engagement elements without being rotated relative to the speed nut.

In one embodiment, the at least one engagement element is tiltable between the first position and the second position. In one embodiment, when the threaded member is inserted through the first opening and between the engagement elements, at least one of the engagement elements is contacting the threaded member. In one embodiment, the speed nut is rotatable relative to the threaded member for engaging the inner surface of each of the engagement elements with the thread of the threaded member when the at least one engagement element is in the first position.

In one embodiment, the inner surface of each of the engagement elements includes an arcuate edge, the arcuate inner edges of the plurality of engagement elements forming an opening therebetween, the opening having a first diameter less than an outer diameter of the thread of the threaded member when the at least one engagement element is in the first position and having a second diameter greater than the outer diameter of the thread when the at least one engagement element is in the second position.

Other features and advantages of embodiments of the present invention will become apparent from the following detailed description, taken in conjunction with the accompanying drawings which illustrate, by way of example, features and aspects of exemplary embodiments of the present invention.

BRIEF DESCRIPTION OF THE DRAWINGS

The above and other features, aspects, and advantages of the present invention will become better understood with regard to the following description, appended claims, and accompanying drawings where:

DETAILED DESCRIPTION

Figure 1:
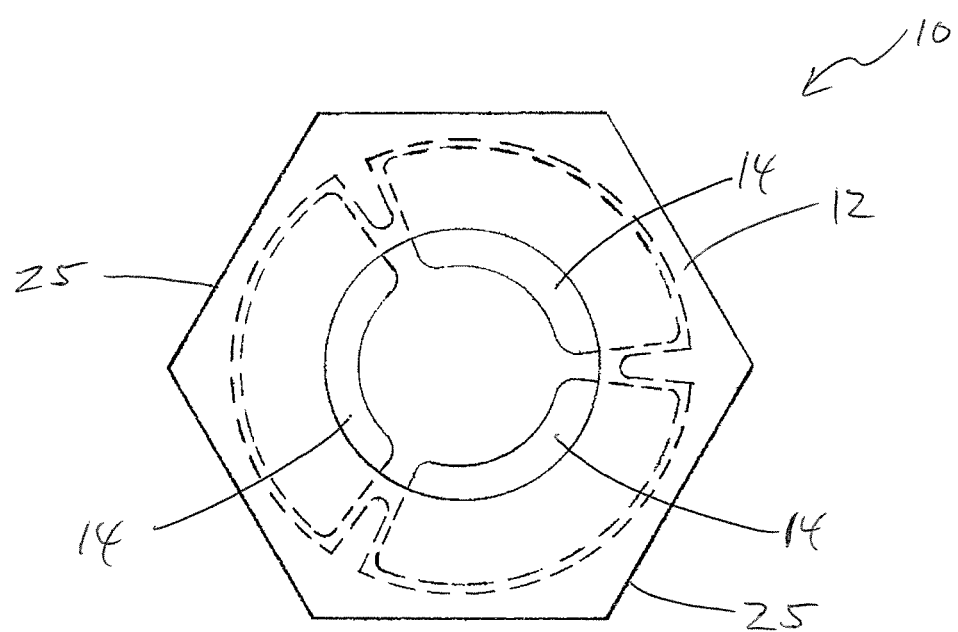
FIG. 1 is a top view of a speed nut according to an embodiment of the present invention.

In the following detailed description, certain exemplary embodiments of the present invention are shown and described, by way of illustration. As those skilled in the art would recognize, the described exemplary embodiments may be modified in various ways without departing from the spirit and scope of the present invention. Accordingly, the drawings and description are to be regarded as illustrative in nature, rather than restrictive. Further, terms such as "upper," "lower," "top," "bottom," "upward," and "downward" are used herein for the purpose of more clearly describing the location and/or orientation of components or features relative to others, as shown in the drawings, for example. However, the use of such terms is not intended or to be regarded as limiting the use of the invention to any particular position or orientation. Also, the term "speed nut," is used herein to refer to a nut or nut-like structure including, but not limited to, a stand-alone nut, a nut that is integrally formed with a plate, a pipe, or any other structural member, and a portion of a plate, pipe, or other structural member having a nut-like structure.

With reference to FIGS. 1-4, a speed nut 10 according to one exemplary embodiment of the present invention includes a housing 12 and a plurality of engagement elements 14 within the housing 12. The housing 12 has a cavity 35 through a central portion thereof for receiving an externally threaded member. One or more of the engagement elements 14 are movable, or splayable, within the housing 12 between a first position, or engagement position, wherein an inner surface of the engagement element 14 is engageable with a thread of a threaded member to block removal of the threaded member from an opening 18 of the speed nut 10 and a second position, or splayed position, wherein a threaded portion of the threaded member is insertable through the opening 18 of the speed nut 10 between the engagement elements 14 without being rotated relative to the speed nut 10.

The housing 12 includes a first wall 20 (e.g., a lower wall), a second wall 22 (e.g., an upper wall), and an outer wall 24 extending between and connecting outer portions of the first wall 20 and the second wall 22. The cavity 35 is defined by an inner surface 21 of the first wall 20 on one side and an inner surface 23 of the second wall 22 on an opposite side. Further, the cavity 35 is inside the outer wall 24. In one embodiment, the inner surface 23 of the second wall 22 is inclined in a radial direction relative to the inner surface 21 of the first wall 20 such that a distance between the inner surface 23 of the second wall 22 and the inner surface 21 of the first wall 20 increases along an inward radial direction from an inner surface 26 of the outer wall 24.

The first wall 20 has an opening 27 for receiving a threaded member therethrough. The opening 27 is formed through the first wall 20 and extends into the cavity 35 such that a threaded member may be inserted into the cavity 35 for engagement with the engagement elements 14. Further, in one embodiment, the second wall 22 has an opening 28 for receiving a threaded member therethrough. The opening 28 may be formed through the second wall 22 and extend into the cavity 35 such that a threaded member may be inserted through both the openings 27 and 28 and extend completely through the speed nut 10. The opening 28 of the second wall 22 may have a size and location substantially corresponding to a size and location of the opening 27 of the first wall 20. The openings 27 and 28 are located substantially at a center of the respective first and second walls 20 and 22, between which extends a longitudinal axis 15 of the housing 12, and have a diameter slightly larger than an outer diameter of a threaded member with which the speed nut 10 is to be paired. In an alternative embodiment, the second opening 28 may be absent from the second wall 22. That is, the speed nut 10, in one embodiment, may be configured as a cap nut, for example, in which the second wall 22 does not have an opening.

Figure 2:
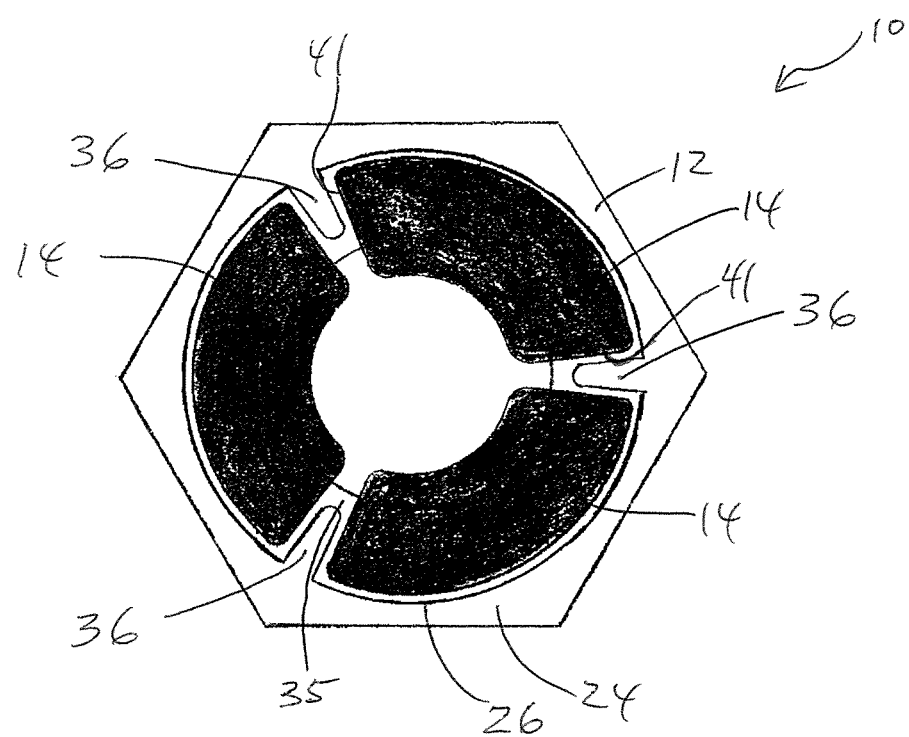
FIG. 2 is a sectional view of the speed nut of FIG. 1.

An outside of the outer wall 24, in one embodiment, includes at least one pair of opposing flats 25 configured to allow a user to grip the speed nut 10, such as with a wrench or other tool. For example, an outer perimeter of the outer wall 24 may have a hexagonal shape (as shown in FIGS. 1 and 2), a square shape, or any other suitable shape for gripping the speed nut 10 during tightening or loosening of the speed nut 10 on a threaded member. In an exemplary embodiment, the flats 25 are substantially parallel to the longitudinal axis 15 of the housing 12.

The housing 12, in one embodiment, further includes partition walls 36 between adjacent engagement elements 14. The partition walls 36 protrude inward from the outer wall 24 into the cavity 35, as shown in FIG. 2, and extend between the inner surface 21 of the first wall 20 and the inner surface 23 of the second wall 22. Alternatively, the partition walls 36 may extend between the inner surface 21 of the first wall 20 and the inner surface 23 of the second wall 22 while being spaced apart from the outer wall 24. Because, in one embodiment, the engagement elements 14 are unfixed, or floating, in the cavity 35, the partition walls 36 function to retain the engagement elements 14 in the cavity 35 and maintain the engagement elements 14 in respective positions separated from one another for engaging a thread of a threaded member. That is, in one embodiment, as illustrated in FIG. 2, a pair of partition walls 36 extending inward at opposite ends 41 of each of the engagement elements 14 retains the engagement element 14 in the cavity because the opposite ends 41 of the engagement element 14 abut and are obstructed by the partition walls 36 when the engagement element 14 is moved radially inward toward the longitudinal axis 15 of the speed nut 10.

Figure 5:
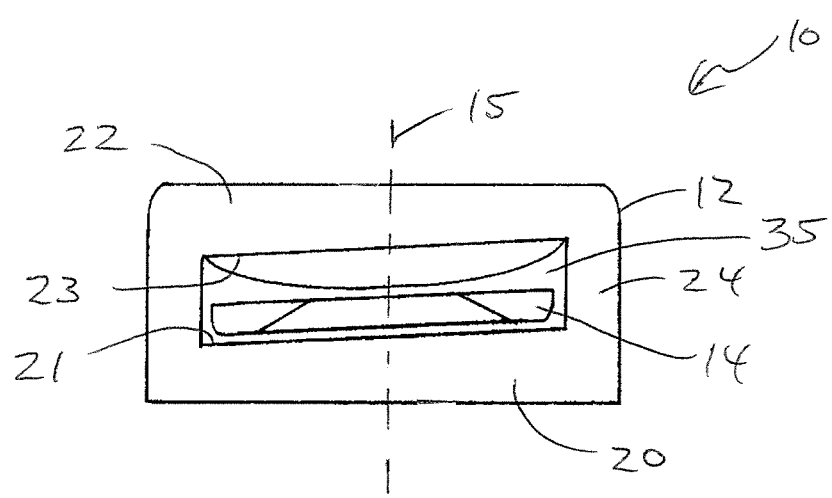
FIG. 5 is a schematic sectional view of the speed nut of FIG. 1.

With reference to FIG. 5, in one embodiment, the inner surface 21 of the first wall 20 is inclined in a circumferential direction about the longitudinal axis 15 such that an engagement surface of the engagement element 14 on the inner surface 21 has a gradually varying location along the longitudinal axis 15 to correspond to the angle of the thread of a threaded member received in an opening between the engagement elements 14. As such, an engagement element 14 may be tilted, or higher on one side (e.g., the right side in FIG. 5) than the same or another engagement element 14 on another side of the inner surface 21 (e.g., the left side in FIG. 5). Similarly, in one embodiment, the inner surface 23 of the second wall 22 is inclined in a circumferential direction about the longitudinal axis 15. For example, a distance between the inner surface 23 of the second wall 22 and the inner surface 21 of the first wall 20 may be constant in the circumferential direction at a same radial distance from the longitudinal axis 15. However, in alternative embodiments, the inner surface 23 of the second wall 22 and/or the inner surface 21 of the first wall 20 may be substantially perpendicular to the longitudinal axis 15.

The housing 12 may be made of any suitable material, such as a metal, a plastic material, fiberglass, a ceramic, or a combination thereof. Further, the housing 12 may be formed by any suitable device or method, such as molding, casting, machining, stamping, or a combination thereof. Also, in one embodiment, the housing 12 may be formed of two or more pieces that are coupled together, such as via welding, an adhesive, or any other suitable device or method, or detachably coupled.

Figure 6:
FIG. 6 is a top view of an engagement element of the speed nut of FIG. 1.
Figure 7:
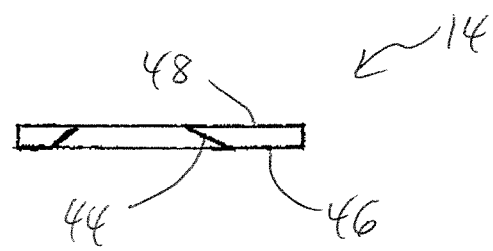
FIG. 7 is a side view of the engagement element of FIG. 6.
Figure 8:
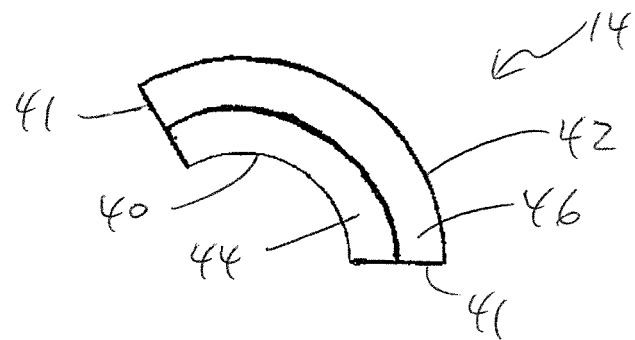
FIG. 8 is a bottom view of the engagement element of FIG. 6.
Figure 9A:
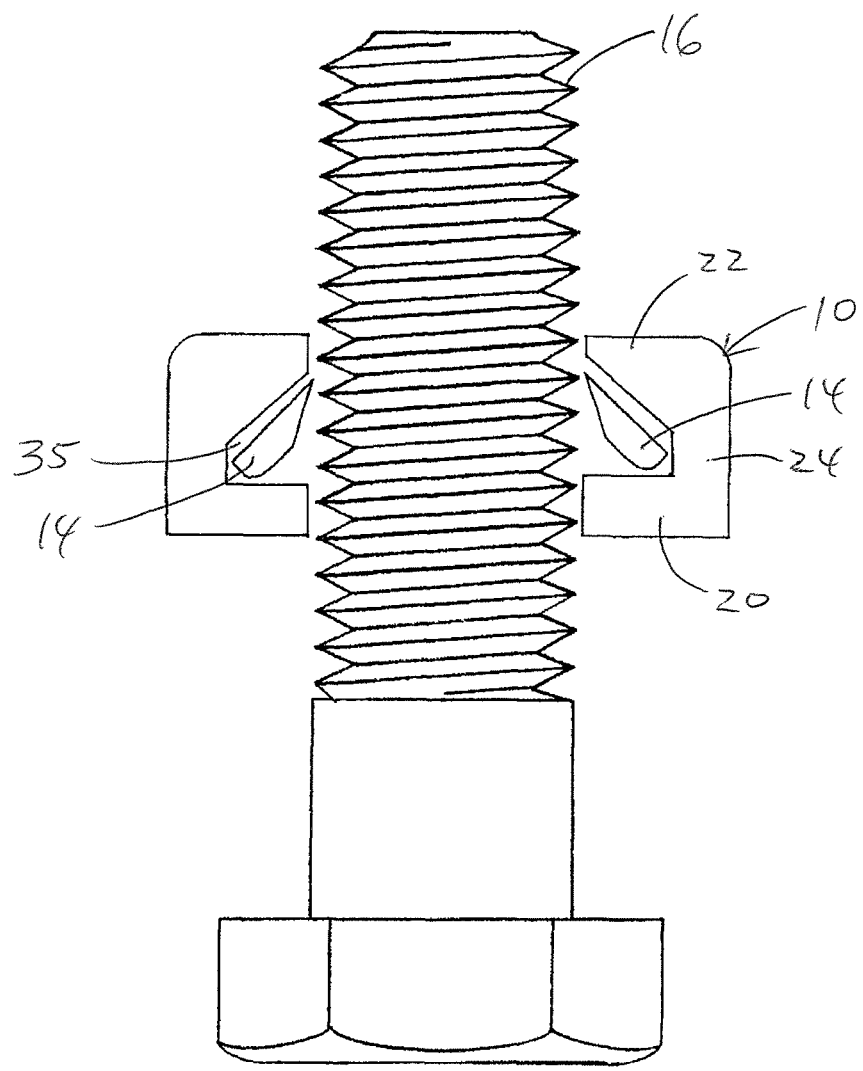
FIG. 9A is a sectional view of the speed nut of FIG. 1 on a threaded member, engagement elements of the speed nut in a position for inserting the threaded member between the engagement elements.

With reference to FIGS. 6-8, in one embodiment, each of the engagement elements 14 is configured as a washer portion having an inner arcuate surface 40 and an outer arcuate surface 42. In one embodiment, the inner and outer surfaces 40 and 42 each span an angle of about 120 degrees. However, embodiments of the present invention are not limited thereto and, in other embodiments, the engagement elements 14 may have inner and outer surfaces 40 and 42 spanning any other suitable angle less than or greater than 120 degrees, or one engagement element 14 may span a different angle than an adjacent engagement element 14. In one embodiment, the engagement element 14 includes a tapered portion 44 on a first side 46 of the engagement element 14 facing the first wall 20 of the housing 12. The tapered portion 44, in one embodiment, extends from the inner surface 40 to a region of the first side 46 between the inner and outer surfaces 40 and 42. Further, in one embodiment, the tapered portion 44 has an arcuate shape corresponding to that of the inner surface 40 and extends from one of the ends 41 to the opposite end 41 of the engagement element 14. In one embodiment, as shown in FIG. 7, the inner surface 40 is an edge where the tapered portion 44 intersects with a second side 48 of the engagement element 14 opposite the first side 46. However, in other embodiments, the inner surface 40 may have a greater thickness or may be rounded. The tapered portion 44 facilitates passage of a threaded member between the plurality of engagement elements 14 when the engagement elements 14 are in the splayed position, as shown in FIG. 9A and described further below.

Figure 3:
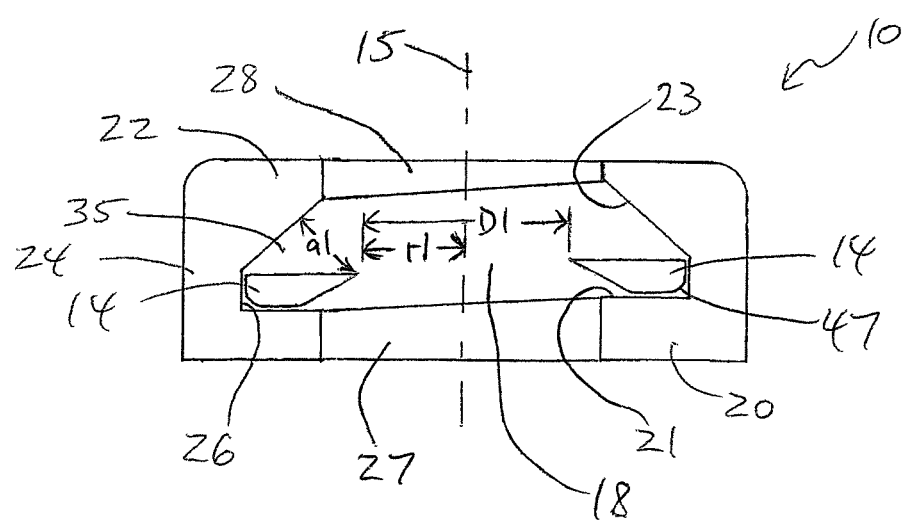
FIG. 3 is a sectional view of the speed nut of FIG. 1 showing engagement elements of the speed nut in a first position for engaging a threaded member.
Figure 4:
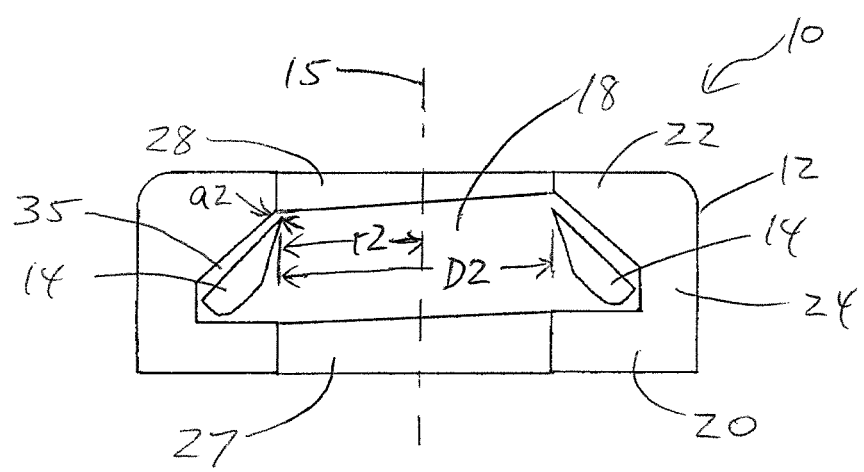
FIG. 4 is a sectional view of the speed nut of FIG. 1 showing engagement elements of the speed nut in a second position for inserting a threaded member between the engagement elements.

In one embodiment, an outward portion of the first side 46 of the engagement element 14 outside the tapered portion 44 may be substantially flat and may have a rounded outer edge 47 (see FIG. 3) to facilitate a rotating, or splaying, movement of the engagement element 14 from a first position to a second position, as depicted in FIG. 4. In one embodiment, the second side 48 of the engagement element 14 opposite the first side 46 and facing the second wall 22 of the housing 12 is substantially flat.

The engagement elements 14 may be made of any suitable material, such as a metal, a plastic material, fiberglass, a ceramic, or a combination thereof. In one embodiment, for example, the engagement elements 14 are made of a hard, rigid material. That is, it is not critical that the engagement elements 14 of embodiments of a speed nut according to the present invention be flexible or deformable in order for the speed nut 10 to rapidly and forcefully engage a threaded member as described herein. As a result, the speed nut 10, including the engagement elements 14, may be formed of any of a wide array of materials, such as a rigid ceramic material suitable for use in a corrosive environment, for example. Also, because the speed nut 10, in one embodiment, includes the engagement elements 14 made from a rigid material, rather than a deformable material, the speed nut 10 may be reused and is less susceptible to fatigue or wear due to reuse or passage of time during a first use. On the other hand, in another embodiment, the engagement elements 14 may be formed of a relatively less hard material because the engagement elements 14 are not required to cut into a threaded member in order for the speed nut 10 according to embodiments of the present invention to adequately engage the threaded member. Further, the engagement elements 14 may be formed by any suitable device or method, such as molding, casting, machining, stamping, or a combination thereof.

The engagement elements 14 are arranged in the cavity 35 about the longitudinal axis 15 of the housing 12 to form the opening 18 between the engagement elements 14. The engagement elements 14, in one embodiment, are freely movable in the cavity 35 between a first position wherein a portion of the inner surface 40 is spaced from the longitudinal axis 15 by a first radial distance r1 for engaging a threaded member and a second position wherein the portion of the inner surface 40 is spaced from the longitudinal axis 15 by a second radial distance r2 greater than the first radial distance r1 for receiving a threaded member through the opening 18 between the engagement elements 14. That is, the engagement elements 14 may be floating and freely movable without restraint in the cavity 35, with the exception of the restraint provided on the opposite ends 41 by the partition walls 36 as the engagement elements 14 move inward in the radial direction. Further, when the engagement elements 14 are in the first position, the opening 18 between the engagement elements 14 has a first diameter D1, and when the engagement elements 14 are in the second position, the opening 18 between the engagement elements 14 has a second diameter D2 greater than the first diameter D1. In one embodiment, each of the engagement elements 14 is floating and freely movable between the first and second positions. However, in other embodiments, one or any other suitable number of the engagement elements 14 may be movable between the first and second positions, while others may be fixed or have a limited range of movement.

Further, in one embodiment, one or more of the engagement elements 14 are tiltable, or pivotable, between the first position wherein a portion of the inner surface 40 is spaced from the inner surface 23 of the second wall 22 by a first distance a1 and the second position wherein the portion of the inner surface 40 is spaced from the inner surface 23 of the second wall 22 by a second distance a2 that is less than the first distance a1. In tilting, or pivoting, the direction of movement of the engagement element 14 has a radial component and a longitudinal component relative to the longitudinal axis 15. However, one or more of the engagement elements 14 may be freely movable in the cavity 35 in a direction having only a radial component, with the exception of the restraint provided on the opposite ends 41 by the partition walls 36, as discussed above, or only a longitudinal component relative to the longitudinal axis 15.

As shown in FIGS. 3 and 4, in one embodiment, the engagement elements 14 of the speed nut 10 are arranged in a single layer. That is, two or more engagement elements 14 are arranged adjacent and along side one another. Further, in one embodiment, as shown in FIG. 2, the speed nut 10 includes three engagement elements 14, each spanning an arc of about 120 degrees from end to end and being arranged adjacent one another at the ends such that the three engagement elements 14 together form a perimeter spanning about 360 degrees and being segmented in three locations. However, embodiments of a speed nut according to the present invention are not limited to three engagement elements 14 and, in other embodiments, the speed nut 10 may include two, four, or any other suitable number of engagement elements 14 arranged adjacent one another at their ends.

With reference to FIGS. 9A-11B, in use, the speed nut 10 is movable over a threaded portion of a threaded member 16 without rotating the speed nut 10 relative to the threaded member 16. At least one of the engagement elements 14 (and possibly all of the engagement elements 14) is movable, or splayable, between a first position, or an engagement position, wherein the inner surface 40 of the at least one engagement element 14 is engageable with the thread of the threaded member 16 (see FIG. 11A) and a second position, or splayed position, wherein a threaded portion of the threaded member 16 is insertable through the opening 27 of the first wall 20 and through the opening 18 between the engagement elements 14 without being rotated relative to the speed nut 10 (see FIG. 9A). More specifically, in one embodiment, the engagement elements 14 are freely movable such that the second radial distance r2 between the inner surface 40 of the at least one engagement element 14 and the longitudinal axis 15 is greater in the second position than the first radial distance between the inner surface 40 of the at least one engagement element 14 and the longitudinal axis 15 when the at least one engagement element 14 is in the first position. Further, the second diameter d2 of the opening 18 is greater when the at least one engagement element 14 is in the second position than the first diameter d1 of the opening 18 when the at least one engagement element 14 is in the first position.

Figure 9B:
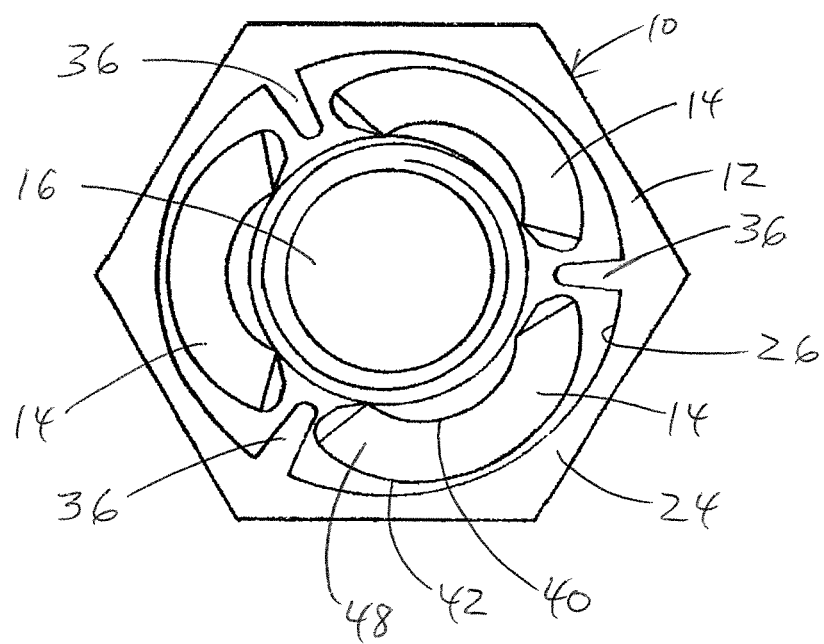
FIG. 9B is a top view of the speed nut of FIG. 1 on the threaded member of FIG. 9A, an upper wall of the speed nut removed for purposes of illustration.

With reference to FIGS. 9A and 9B, when the engagement members 14 are in the second, or splayed, position, the speed nut 10 is movable over the threaded member 16 without rotation of the speed nut 10 relative to the threaded member 16. Further, when the engagement elements 14 are in the splayed position, due to the curvature of the inner surface 40, the opposite ends of the inner surface 40 may be nearer to the threaded member 16 than a central portion of the inner surface 40, as illustrated in FIG. 9B.

In one embodiment, because one or more of the engagement elements 14 are floating in the cavity 35, the engagement elements 14 function to align the speed nut 10 on the threaded member 16, as well as engage the speed nut 10 with the thread of the threaded member 16. Further, only a small amount of force is required to move the speed nut 10 over the threaded member 16 to the desired position for engagement. Additionally, because the speed nut 10 is easily movable over the threaded member 16 in the longitudinal direction when the engagement elements 14 are in the splayed position, a damaged or defective portion of the thread of the threaded member 16 generally will not hinder engagement of the speed nut 10 with the threaded member 16, unlike with a conventional nut which must remain engaged with the thread of the threaded member 16 while moving past the damaged or defective portion of the thread.

Figure 10:
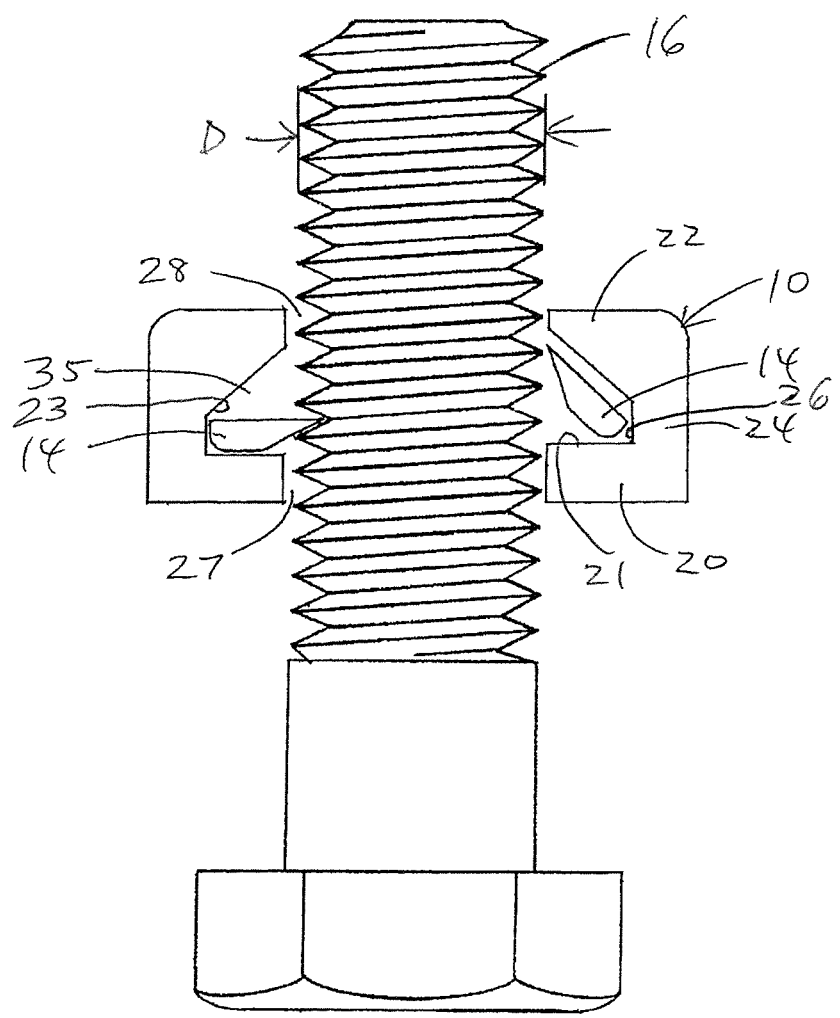
FIG. 10 is a sectional view of the speed nut of FIG. 1 on a threaded member.

With reference to FIG. 10, the speed nut 10 is shown on the threaded member 16 with the engagement element 14 on the right side of the drawing in the second, or splayed, position while the engagement element 14 on the left side of the drawing is shown in the first position engaged with the thread of the threaded member 16. As the speed nut 10 is moved along the threaded member 16 in the longitudinal direction, one or more of the engagement elements 14 will contact the thread of the threaded member 16. Further, when the relative movement between the speed nut 10 and the threaded member 16 is stopped, at least one of the engagement elements 14 will fall or slide into the thread of the threaded member 16, as shown in FIG. 10, thereby engaging the thread. For example, if the speed nut 10 is oriented with the first wall 20 above the second wall 22 (e.g., as seen by turning FIG. 10 upside down), the inclined inner surface 23 of the second wall 22 facilitates the engagement elements 14 in sliding downward in the longitudinal direction and inward in the radial direction on the inclined inner surface 23 and engaging the thread of the threaded member 16. Alternatively, if the speed nut 10 is oriented with the longitudinal axis 15 being substantially horizontal (e.g., as seen by turning FIG. 10 on its side), at least one of the engagement elements 14 above the threaded member 16 will fall or slide into the thread of the threaded member 16. Once one or more of the engagement elements 14 engages the thread of the threaded member, as described above, the speed nut 10 cannot be moved along the threaded member 16 in an opposite direction because the one or more engaged engagement elements 14 will grip the thread of the threaded member 16, and other engagement elements 14 may then engage the thread as well.

Figure 11A:
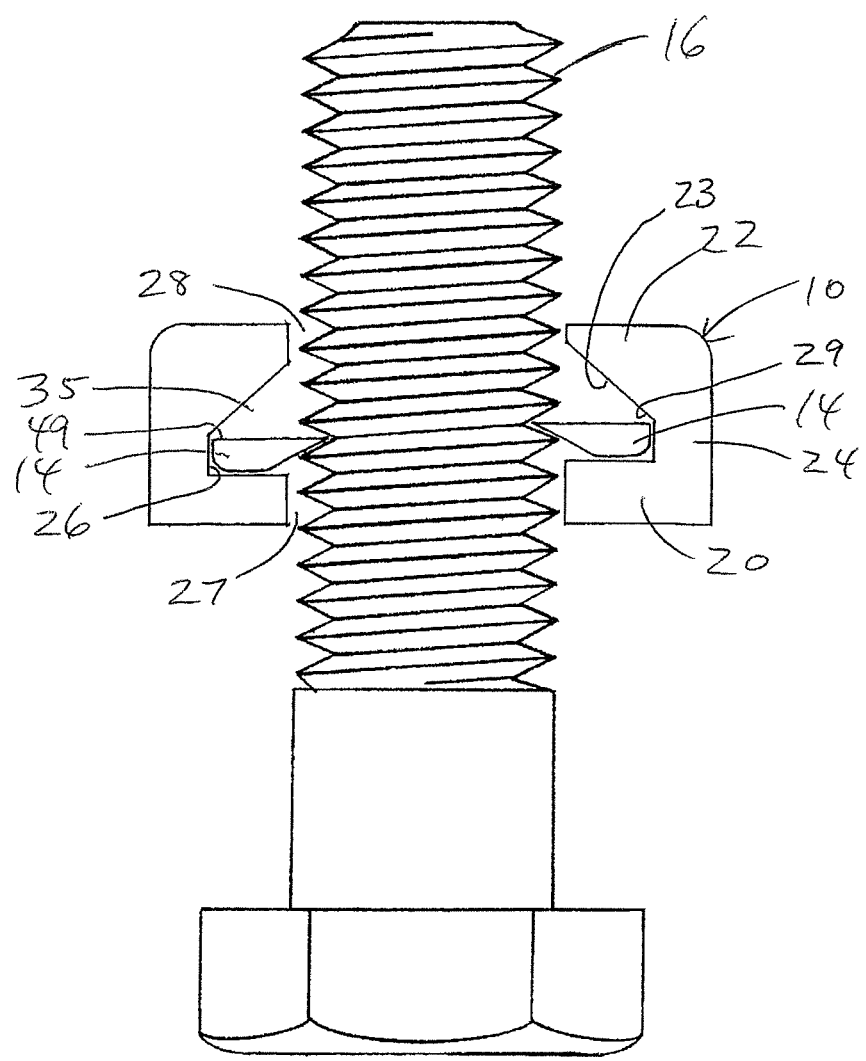
FIG. 11A is a sectional view of the speed nut of FIG. 1 on a threaded member, engagement elements of the speed nut engaging the threaded member.
Figure 11B:
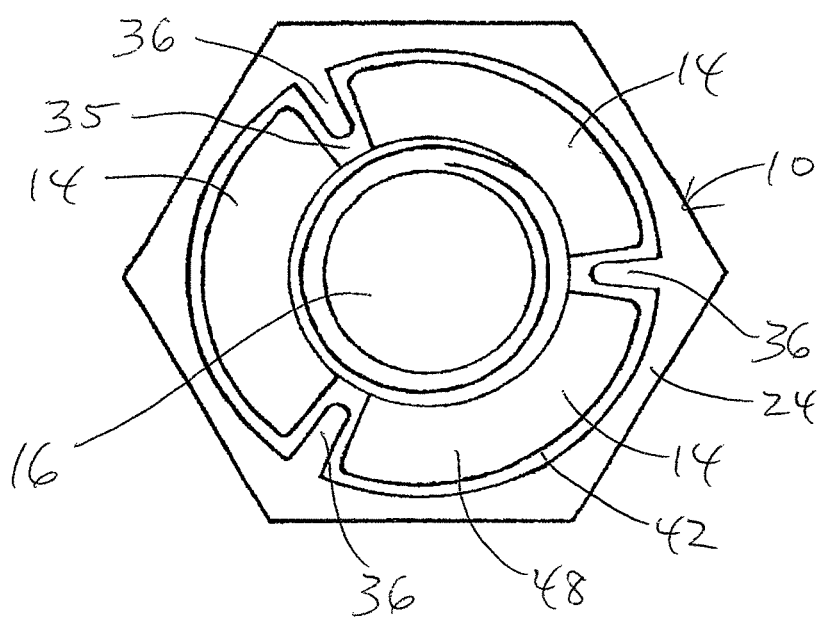
FIG. 11B is a top view of the speed nut of FIG. 1 on the threaded member of FIG. 11A, an upper wall of the speed nut removed for purposes of illustration.

After the speed nut 10 has been moved over the thread of the threaded member 16, or the threaded member 16 has been inserted between the engagement elements 14 of the speed nut 10 to a desired position, the speed nut 10 may be rotated in a first direction relative to the threaded member 16 for engaging the engagement elements 14 with the thread of the threaded member 16 and tightening the speed nut 10. As the speed nut 10 is rotated, the inner surfaces 40 of the engagement elements 14 will align into and engage the thread of the threaded member 16, as shown in FIGS. 11A and 11B. The speed nut 10 may then be tightened by rotating the speed nut 10 relative to the threaded member 16 in the same manner as a conventional nut. Further, the speed nut 10 may subsequently be rotated in a second direction opposite the first direction relative to the threaded member 16 for loosening the speed nut 10. In one embodiment, the speed nut 10 is removed from the threaded member 16 by rotating the speed nut 10 about the threaded member 16 in the same manner as a conventional nut. Further, embodiments of the speed nut 10 of the present invention may be removed from the threaded member 16 without deformation or destruction of either the speed nut 10 or the threaded member 16, each of which may be reused.

With further reference to FIG. 11A, an outer diameter portion 29 of the inclined inner surface 23 of the second wall 22 prevents or substantially prevents the threaded member 16 from being pulled out from between the plurality of engagement elements 14 when the engagement elements 14 are engaged with the thread of the threaded member 16 due to an outer diameter portion 49 of the second side 48 of the engagement element 14 contacting against the outer diameter portion 29 of the inclined inner surface 23. That is, in one embodiment, outer diameter portions of the engagement elements 14 fit relatively tightly in the longitudinal direction at the outer portion of the cavity 35 such that the outer diameter portions 49 of the second surface 48 of the engagement elements 14 may abut against the outer diameter portion 29 of the inclined inner surface 23 proximate the inner surface 26 of the outer wall 24 for holding the engagement elements 14 engaged with the thread of the threaded member 16.

While the threaded member 16 is depicted as a bolt in the drawings, the threaded member 16 may alternatively be a threaded rod, stud, cable, or any other externally threaded member. Alternatively, the speed nut 10 may be movable over a non-threaded member (e.g., a member having a series of grooves or any other suitable pattern for gripping, or a member that is compressible and/or has a high coefficient of friction, such as a rubber insert) without rotating the speed nut 10 relative to the non-threaded member for engaging the non-threaded member.

Figure 12:
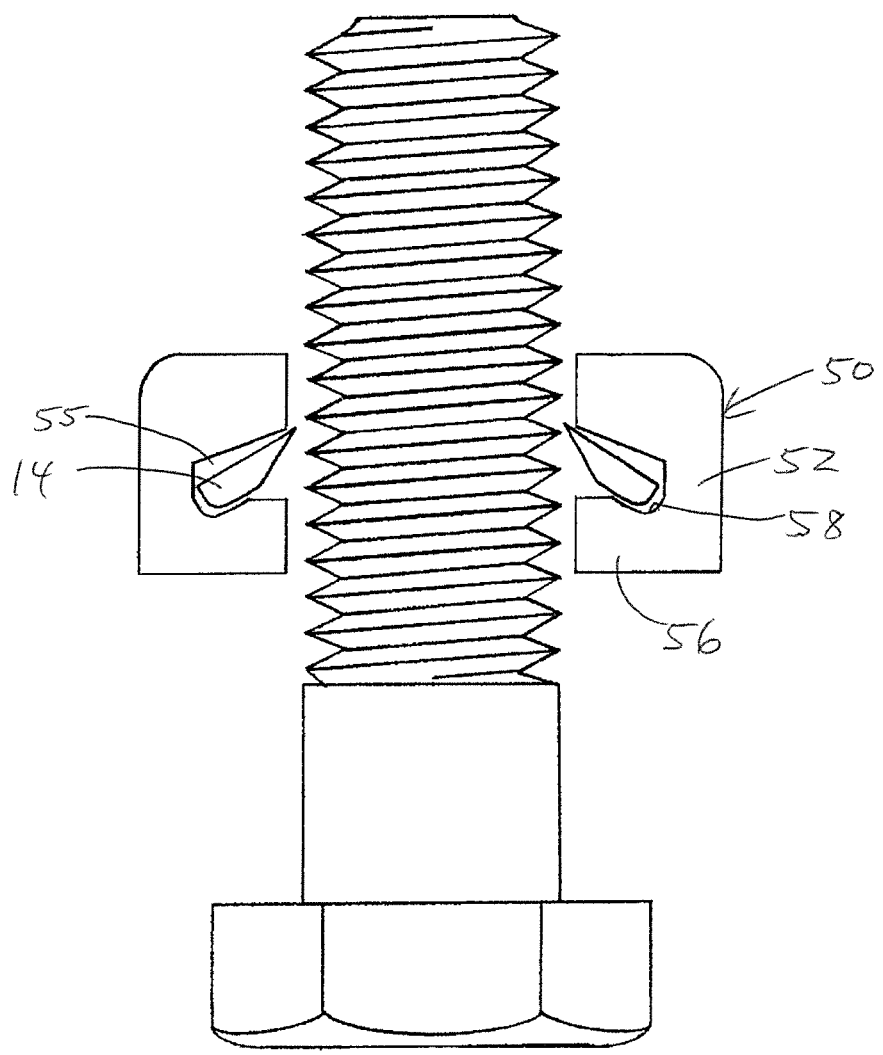
FIG. 12 is a sectional view of a speed nut according to another embodiment of the present invention on a threaded member.

With reference to FIG. 12, a speed nut 50 according to another embodiment of the present invention includes a housing 52 and a plurality of the engagement elements 14 arranged in a cavity 55 of the housing 52. The housing 52 includes a first wall 56 having a recessed portion 58 on an inner surface thereof. The recessed portion 58 provides a space for receiving a portion of one or more of the engagement elements 14 for facilitating movement, such as tilting, of the engagement element 14 between the first and second positions described above with respect to the speed nut 10. Other elements and features of the speed nut 50 are the same or similar to those described above with respect to the speed nut 10, and a description thereof will not be repeated herein.

Figure 13:
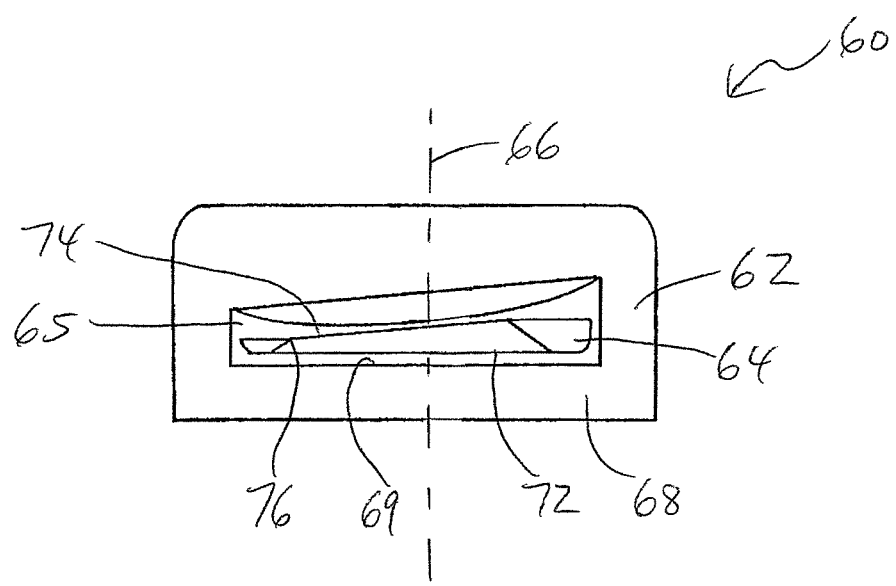
FIG. 13 is a schematic sectional view of a speed nut according to another embodiment of the present invention.

With reference to FIG. 13, a speed nut 60 according to another embodiment of the present invention includes a housing 62 and a plurality of engagement elements 64 arranged in a cavity 65 of the housing 62 about a longitudinal axis 66. The housing 62 includes a first wall 68 having an inner surface 69 that is substantially perpendicular to the longitudinal axis 66. One or more of the engagement elements 64 include a first side 72 that is substantially flat and a second side 74 opposite the first side 72 that is inclined in a circumferential direction about the longitudinal axis 66. That is, a thickness of the engagement element 64 in the circumferential direction gradually increases such that an inner surface 76 of the engagement element 64 adjacent the second side 72 has a gradually varying location along the longitudinal axis 66 to correspond to the angle of the thread of a threaded member received in an opening between the engagement elements 64. Other elements and features of the speed nut 60 are the same or similar to those described above with respect to the speed nut 10, and a description thereof will not be repeated herein.

Figure 14:
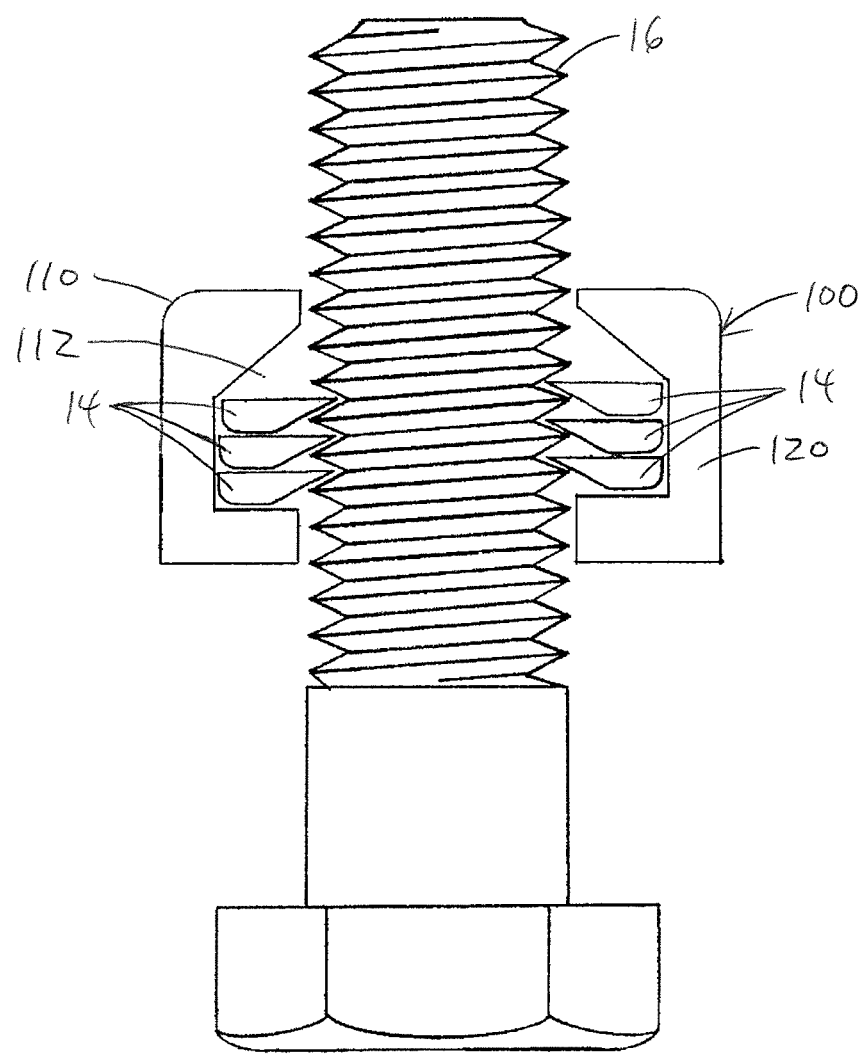
FIG. 14 is a sectional view of a speed nut according to another embodiment of the present invention on a threaded member.
Figure 15:
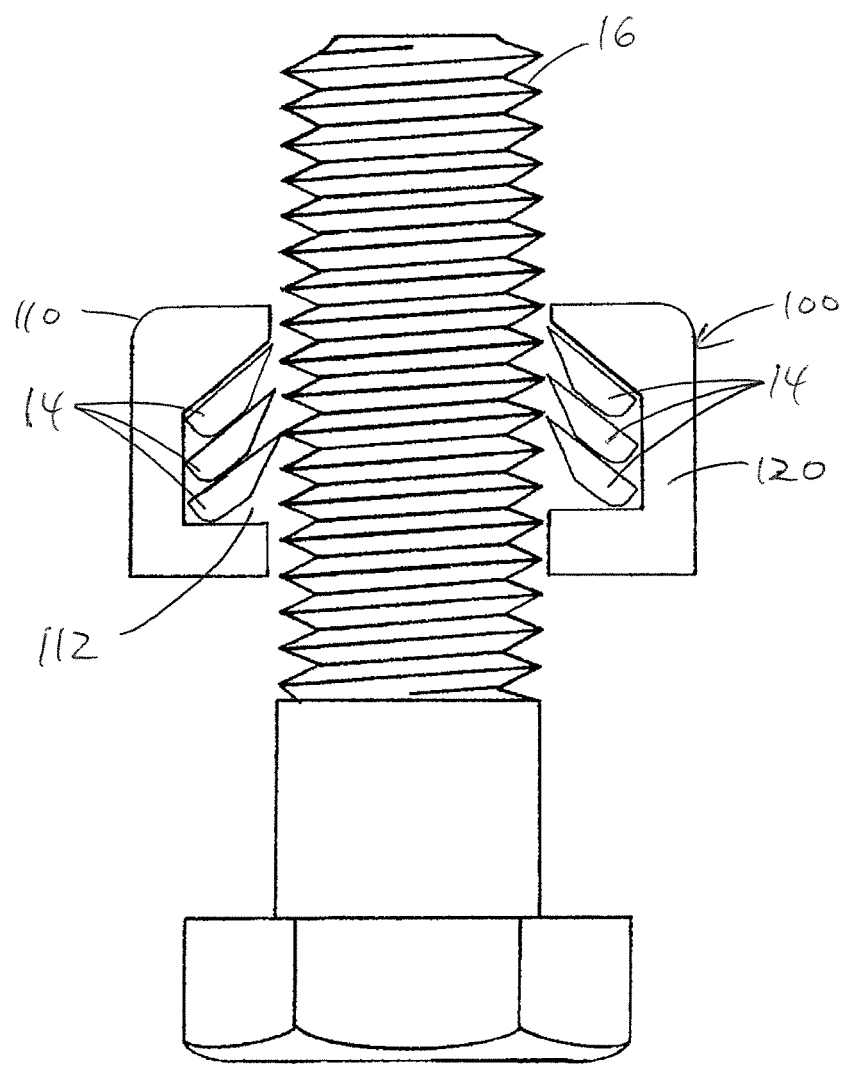
FIG. 15 is a sectional view of the speed nut of FIG. 14 engaged with the threaded member.

With reference to FIGS. 14 and 15, a speed nut 100 according to another embodiment of the present invention includes a housing 110 and a plurality of engagement elements 14 arranged in multiple layers within a cavity 112 of the housing 110. That is, the speed nut 100 may include a plurality of first engagement elements 14 arranged along side one another to form a first layer, and a plurality of second engagement elements 14 arranged on, or stacked on, the first engagement elements 14, to form an additional layer or layers. Each of the individual engagement elements 14 may have the same or substantially the same configuration as those of the speed nut 10, as described above. Further, the housing 110 of the speed nut 100 may be configured similarly to the housing 12 of the speed nut 10 described above, with the exception that an outer wall 120 of the housing 110 and, as a result, the cavity 112 also, may have a greater length than the outer wall 24, and the cavity 35, of the housing 12 in order to accommodate the multiple layers of engagement elements 14 in the cavity 112 of the speed nut 100. Other elements and features of the speed nut 10 described above may be included in the speed nut 100, and a description thereof will not be repeated herein.

The multiple layers of engagement elements 14 of the speed nut 100 provide the speed nut 100 with a greater fastening strength. That is, a greater torque may be applied to the speed nut 100 due to the greater number of engagement elements 14. Further, the speed nut 100 is more resistant to lateral movement (i.e. movement in a direction perpendicular to a longitudinal axis of the threaded member 16) due to the multiple layers of engagement elements 14. Further, while in FIGS. 14 and 15, the speed nut 100 is shown having the second engagement elements 14 arranged, or stacked, directly on and contacting the first engagement elements 14, in other embodiments, the second engagement elements 14 may be spaced apart from the first engagement elements 14 without contacting the first engagement elements 14. For example, in another embodiment, the housing 110 may include separating, or reinforcing, walls extending between and separating the second engagement elements 14 from the first engagement elements 14.

Although the drawings and accompanying description illustrate some exemplary embodiments of a speed nut, it will be apparent that the novel aspects of the present invention may also be carried out by utilizing alternative structures, sizes, shapes, and/or materials in embodiments of the speed nut of the present invention. For example, in one alternative embodiment, a housing of a speed nut may include an upper wall having an inner surface that is not inclined in a radial direction relative to an inner surface of a lower wall but, rather, is substantially parallel to the inner surface of the lower wall. Also, for example, in one alternative embodiment, a speed nut may include a housing including a lower wall having an inner surface that is not inclined in a circumferential direction and an upper wall having an inner surface that is not inclined in a circumferential direction, and an engagement element having an upper side that is not inclined in a circumferential direction but, rather, each of which is substantially perpendicular to a longitudinal axis of the speed nut. Also, for example, as discussed above, a speed nut according to embodiments of the present invention may be a stand-alone nut, as depicted in the drawings, or alternatively may be integrally formed with a plate, a pipe, or any other structural member, or may be a portion of a plate, pipe, or other structural member having a nut-like structure. For example, in one embodiment, a first length of pipe may include a speed nut of the present invention for engaging a threaded portion of a second length of pipe. As such, a speed nut according to various embodiments of the present invention may be used to fasten or connect a wide variety of components, with or without threads at the point of connection.

The preceding description has been presented with reference to various embodiments of the invention. Persons skilled in the art and technology to which this invention pertains will appreciate that alterations and changes in the described structures and methods of operation can be practiced without meaningfully departing from the principles, spirit, and scope of this invention.

What is claimed is:

1. A speed nut for engaging a member, the speed nut comprising:
    a housing comprising a first wall including a first inner surface and having a first opening therethrough for receiving the member, a second wall including a second inner surface facing the first inner surface, and an outer wall extending between the first and second walls, the first and second walls defining a cavity therebetween; and
    a plurality of engagement elements arranged in the cavity between the first and second walls about a longitudinal axis of the housing to form an opening therebetween, each of the engagement elements comprising an inner surface distal from the outer wall,
    wherein at least one of the engagement elements is freely movable in the cavity relative to at least another one of the engagement elements between a first position wherein a portion of the inner surface of the at least one engagement element is spaced from the longitudinal axis by a first radial distance for engaging the member and a second position wherein the portion of the inner surface of the at least one engagement element is spaced from the longitudinal axis by a second radial distance greater than the first radial distance for receiving the member through the opening,
    wherein the at least one engagement element is tiltable between the first position and the second position, and
    wherein the outer wall is at a same fixed position relative to the first and second walls when the at least one engagement element is in the first and second positions.

2. The speed nut of claim 1, wherein, in the first position, the portion of the inner surface of the at least one engagement element is spaced from the second inner surface by a first distance, and in the second position, the portion of the inner surface of the at least one engagement element is spaced from the second inner surface by a second distance less than the first distance.

3. The speed nut of claim 1, wherein each of the engagement elements is freely movable in the cavity between the first position and the second position.

4. The speed nut of claim 1, wherein at least one of the engagement elements further comprises a tapered portion extending from the inner surface and facing the first inner surface.

5. The speed nut of claim 1, wherein the housing further comprises a plurality of partitions protruding from the outer wall into the cavity, a respective one of the plurality of partitions being between each respective pair of adjacent engagement elements of the plurality of engagement elements.

6. The speed nut of claim 1, wherein the second wall has a second opening therethrough for receiving the member, the second opening substantially corresponding to the first opening.

7. The speed nut of claim 1, wherein the second inner surface is inclined relative to the first inner surface.

8. The speed nut of claim 1, wherein the inner surface of each of the engagement elements comprises an arcuate edge.

9. A speed nut for engaging a member, the speed nut comprising:
    a housing comprising a first wall having a first opening therethrough for receiving the member, a second wall opposite the first wall, and an outer wall extending between the first and second walls, the first and second walls defining a cavity therebetween; and
    a plurality of engagement elements arranged in the cavity about a longitudinal axis of the housing to form an opening therebetween, each of the engagement elements comprising an inner surface distal from the outer wall, the plurality of engagement elements comprising first engagement elements and second engagement elements spaced from the first engagement elements in a direction coinciding with the longitudinal axis, wherein at least one of the first engagement elements and at least one of the second engagement elements that is spaced from the at least one first engagement element in the direction coinciding with the longitudinal axis are freely movable in the cavity between respective first positions wherein a portion of the inner surface of the respective engagement element is spaced from the longitudinal axis by a respective first radial distance for engaging the member and respective second positions wherein the portion of the inner surface of the respective engagement element is spaced from the longitudinal axis by a respective second radial distance greater than the respective first radial distance for receiving the member through the opening, the at least one first engagement element being movable relative to the at least one second engagement element that is spaced from the at least one first engagement element in the direction coinciding with the longitudinal axis.

10. The speed nut of claim 9, wherein the at least one first engagement element and the at least one second engagement element are tiltable between the respective first positions wherein the portion of the inner surface of the respective engagement element is spaced from the second wall by a respective first distance and the respective second positions wherein the portion of the inner surface of the at least one engagement element is spaced from the second wall by a second distance less than the first distance.

11. The speed nut of claim 9, wherein at least one of the first engagement elements contacts at least one of the second engagement elements.

12. The speed nut of claim 9, wherein the first wall comprises a first inner surface, and the second wall comprises a second inner surface facing and inclined relative to the first inner surface.

13. The speed nut of claim 9, wherein at least one of the engagement elements further comprises a tapered portion extending from the inner surface and facing the first wall.

14. A speed fastener assembly comprising:
a threaded member comprising a thread; and
a speed nut comprising:
    a housing comprising a first wall having a first opening therethrough, a second wall opposite the first wall, and an outer wall extending between the first and second walls, the first and second walls defining a cavity therebetween; and
    a plurality of engagement elements arranged in the cavity between the first and second walls about a longitudinal axis of the housing, each of the engagement elements comprising an inner surface distal from the outer wall,
wherein at least one of the engagement elements is freely movable in the cavity relative to at least another one of the engagement elements between a first position wherein the inner surface of the at least one engagement element is engageable with the thread of the threaded member and a second position wherein the threaded member is insertable through the first opening and between the engagement elements without being rotated relative to the speed nut,
wherein the at least one engagement element is tiltable between the first position and the second position, and
wherein the outer wall is at a same fixed position relative to the first and second walls when the at least one engagement element is in the first and second positions.

15. The speed fastener assembly of claim 14, wherein when the threaded member is inserted through the first opening and between the engagement elements, at least one of the engagement elements is contacting the threaded member.

16. The speed fastener assembly of claim 14, wherein the speed nut is rotatable relative to the threaded member for engaging the inner surface of each of the engagement elements with the thread of the threaded member when the at least one engagement element is in the first position.

17. The speed fastener assembly of claim 14, wherein the inner surface of each of the engagement elements comprises an arcuate edge, the arcuate inner edges of the plurality of engagement elements forming an opening therebetween, the opening having a first diameter less than an outer diameter of the thread of the threaded member when the at least one engagement element is in the first position and having a second diameter greater than the outer diameter of the thread when the at least one engagement element is in the second position.

18. The speed fastener assembly of claim 14, wherein the first wall comprises a first inner surface, and the second wall comprises a second inner surface facing and inclined relative to the first inner surface.

19. The speed fastener assembly of claim 14, wherein at least one of the engagement elements further comprises a tapered portion extending from the inner surface and facing the first wall.

* * * * *